US009096377B2

(12) United States Patent
Bergler (10) Patent No.: US 9,096,377 B2
(45) Date of Patent: Aug. 4, 2015

(54) RACE TRACK CONVEYOR AND PACKAGING FACILITY (71) Applicant: Multivac Sepp Haggenmüller GmbH & Co. KG, Wolfertschwenden (DE)

(72) Inventor: Peter Bergler, Probstried (DE)

(73) Assignee: MULTIVAC SEPP HAGGENMUELLER GMBH & CO. KG, Wolfertschwenden (DE)

( * ) Notice: Subject to any disclaimer, the term of this patent is extended or adjusted under 35 U.S.C. 154(b) by 0 days.

(21) Appl. No.: 14/275,205

(22) Filed: May 12, 2014

(65) Prior Publication Data
US 2014/0360845 A1 Dec. 11, 2014

(30) Foreign Application Priority Data

Jun. 5, 2013 (EP) .................................... 13170642

(51) Int. Cl.
| B65G 47/28 | (2006.01) |
| B65G 47/88 | (2006.01) |
| B65G 19/02 | (2006.01) |
| B65G 15/12 | (2006.01) |
| B65G 19/20 | (2006.01) |
| B65G 15/52 | (2006.01) |
| B65B 59/00 | (2006.01) |

(52) U.S. Cl.
CPC .............. *B65G 15/12* (2013.01); *B65B 59/005* (2013.01); *B65G 15/52* (2013.01); *B65G 19/02* (2013.01); *B65G 19/205* (2013.01); *B65G 47/28* (2013.01); *B65G 47/88* (2013.01); *B65G 2811/0605* (2013.01)

(58) Field of Classification Search
CPC ........ B65G 15/52; B65G 15/12; B65G 19/02; B65G 59/005; B65G 19/205; B65G 47/28; B65G 47/88; B65G 2811/0605
USPC ....................... 198/419.3, 726, 728, 733, 817
See application file for complete search history.

(56) References Cited

U.S. PATENT DOCUMENTS

| 3,194,382 | A | * | 7/1965 | Nigrelli et al. | 198/418.1 |
| 4,552,261 | A | * | 11/1985 | Raudat et al. | 198/419.3 |
| 4,768,642 | A | * | 9/1988 | Hunter | 198/419.2 |
| 5,884,749 | A | * | 3/1999 | Goodman | 198/419.3 |
| 6,019,213 | A | * | 2/2000 | Schubert | 198/419.3 |
| 6,382,401 | B2 | * | 5/2002 | Takemoto et al. | 198/803.11 |
| 6,691,856 | B1 | * | 2/2004 | Prakken | 198/419.3 |
| 8,113,335 | B2 | * | 2/2012 | Aronsson et al. | 198/419.3 |
| 8,490,775 | B2 | * | 7/2013 | Volk et al. | 198/419.3 |

(Continued)

FOREIGN PATENT DOCUMENTS

| EP | 1199260 A1 | 4/2002 |
| GB | 2412104 A | 9/2005 |
| WO | 9107343 A1 | 5/1991 |

*Primary Examiner* — Mark A Deuble
(74) *Attorney, Agent, or Firm* — Husch Blacwell LLP (57) ABSTRACT

A race track conveyor having at least two conveyor belts. Each conveyor belt includes a separate drive allowing each conveyor belt to independently transport a group of products from a first end to a second end of the race track conveyor. Each conveyor belt may include two belts, each belt being driven by the respective drive of the conveyor belt. The present race track conveyor may include three conveyor belts. The present race track conveyor may be configured to process different formats when loading and unloading product onto the race track conveyor allowing the race track conveyor to move product machines that have different work cycles.

17 Claims, 6 Drawing Sheets

(56) References Cited

U.S. PATENT DOCUMENTS

2003/0057058 A1* 3/2003 Iwasa .................... 198/419.3
2003/0136641 A1* 7/2003 Iwasa et al. ............ 198/419.3
2009/0313955 A1 12/2009 Gudim et al.
2011/0139582 A1 6/2011 Herrmann

* cited by examiner

RACE TRACK CONVEYOR AND PACKAGING FACILITY

CROSS-REFERENCE TO RELATED APPLICATIONS

This Application claims priority to European Patent Application Number 13170642.6 filed Jun. 5, 2013, to Peter Bergler entitled "Race Track Conveyor and Packaging Facility," currently pending, the entire disclosure of which is incorporated herein by reference.

FIELD OF THE INVENTION

The invention relates to a race track conveyor and a packaging facility including the race track conveyor.

BACKGROUND OF THE INVENTION

Race track conveyors are known to comprise up to three race tracks that are each drivable separately from each other so that each race track can transport a group of products. Such triple belt conveyors comprise three axles with drive wheels and deflection rollers, where a respective drive is attached to each axle in order to separately/independently drive each conveyor belt using the drive wheel and drive associated with that drive axle. Current race track conveyors have a significant drawback in that the conveyor belt that is driven by the axle disposed at the beginning of the transport path is operated in a pushing manner, which is unfavorable from a perspective of drive technology, in particular driving belts having long transport distances. The arrangement of three axles for three race tracks leads to an angle of wrap of only 90° for at least one axle. This brings about the drawback or reducing the number of teeth which engage the belt at the drive roller and, thereby, either limits the transfer of power to the belt or requires an increase in the diameter of the drive roller.

SUMMARY OF THE INVENTION

The object of the present invention is to provide a race track conveyor for a packaging facility that does not have the drawbacks mentioned above.

The race track conveyor according to the invention may comprise at least two, preferably at least three, conveyor belts and may have a separate drive for each conveyor belt. All drives may be arranged at the end of the race track conveyor in a direction of transport to drive all conveyor belts in a pulling manner and to allow for the use of driving pulleys having small diameters and an angle of wrap around the belt pulleys of almost 180° despite high drive performance. This allows the race track conveyor to have a low-profile design and reduces the costs to manufacture.

One embodiment may be particularly space-saving, wherein at least one drive wheel or belt pulley may be provided for each conveyor belt, and where the drive wheels or belt pulleys of several or all conveyor belts may be rotatable about a common axis of rotation. This common axis of rotation may be a deflection axle of the conveyor belts at the downstream end of the race track conveyor.

Preferably, two belts are provided for each conveyor belt in order to be able to process a plurality of tracks with products and thereby enhance performance. The two belts of each conveyor belt are preferably disposed on the right and the left of the track of products on this embodiment of the conveyor belt.

In this, it may be particularly advantageous if an angle of wrap of the belts of the conveyor belts on all driven belt pulleys is at least 160°, preferably at least 170°, or almost 180° to transmit high drive power at the smallest possible diameters of the belt pulleys. Additional tension rollers are not to be interpreted as being belt pulleys within the meaning of the present invention.

A first format at the time of reception of products on the race track conveyor may preferably have a number of tracks and/or rows that differs from a second format at the time of removal of products from the race track conveyor. The race track conveyor may be configured to perform a format change during transportation of the products, i.e., to change the spatial arrangement of the products of the format. A group of products that is placed on the race track conveyor may differ in format from a group of products that is removed from the race track conveyor.

In a particularly advantageous embodiment, a load capacity of one respective conveyor belt may correspond to a multiple of both the first and the second format.

Each race track conveyor may preferably comprise two belts which are connected to advance bars, the advance bars being oriented transversely to the direction of transport. The advance bars may assume the function of pushing or transporting the products, respectively.

A gear device may be preferably provided for at least one of the at least two conveyor belts between the drive and the belt pulleys in order to be able to drive two belts of each one conveyor belt with one drive. The gear device may be preferably a toothed belt gear with toothed belts.

A packaging facility according to the invention may comprise a packaging machine, preferably a thermoforming packaging machine, and an embodiment of the present race track conveyor.

In a particularly advantageous embodiment, the race track conveyor may be disposed downstream of the packaging machine to supply separated packages for further processing. This configuration provides the ability to perform a format change from the format created by the packaging machine (corresponding to a group of packages) to a required other format depending on the device downstream of the race track conveyor. In this, the packaging machine and the downstream device may have different work cycles.

Preferably, a first and a second transfer device may be provided at the race track conveyor in order to receive separated packages onto the race track conveyor as well as to again transfer them to a downstream device, both in a fully automated manner. The transfer devices preferably comprise at least one robot that can be configured, for example, as a two-axle robot or as a delta robot.

A design of the race track conveyor may also be conceivable in which the packages may also laterally approach (move towards) each other during the movement in the direction of transport, for example, in order to save volume for downstream carton loading as the final packaging.

Other aspects and advantages of the present invention will be apparent from the following detailed description of the preferred embodiments and the accompanying drawing figures.

DESCRIPTION OF THE SEVERAL VIEWS OF THE DRAWING

The accompanying drawings form a part of the specification and are to be read in conjunction therewith, in which like reference numerals are employed to indicate like or similar parts in the various views.

FIG. 3b is a schematic sectional side view onto a respective one belt in the race track conveyor of FIG. 3a;

DETAILED DESCRIPTION OF THE INVENTION

The following detailed description of the present invention references the accompanying drawing figures that illustrate specific embodiments in which the invention can be practiced. The embodiments are intended to describe aspects of the present invention in sufficient detail to enable those skilled in the art to practice the invention. Other embodiments can be utilized and changes can be made without departing from the spirit and scope of the present invention. The present invention is defined by the appended claims and, therefore, the description is not to be taken in a limiting sense and shall not limit the scope of equivalents to which such claims are entitled.

Figure 1:
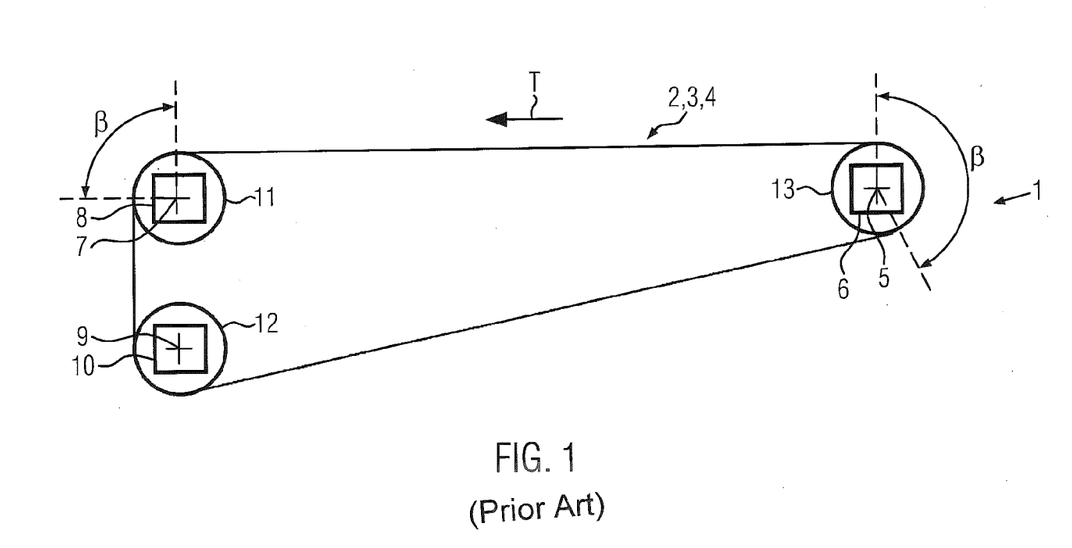
FIG. 1 is a schematic side view of a prior art triple belt conveyor.

FIG. 1 shows a triple belt conveyor 1 according to prior art in a side view. The triple belt conveyor 1 is configured to transport products in a direction of transport T. Three conveyor belts 2, 3, 4 are provided that are arranged in the drawing plane one behind the other. A first conveyor belt 2 is driven at a first axle 5 that is provided at the front end of the triple belt conveyor 1, the first axle 5 being driven by a first drive 6, for example, a servo motor. The second conveyor belt 3 is driven at a second axle 7 that provided at the rear end of the triple belt conveyor 1, the second axle 7 being driven by a second drive 8. The third conveyor belt 4 is driven at a third axle 9 disposed below the second axle 7 by a third drive 10. All three conveyor belts 2, 3, 4 are therefore driven independently of one another, where only the second 3 and the third 4 conveyor belt are operated in a pulling manner. The first conveyor belt 2 is operated in a pushing manner. The angle of wrap β, at which the second conveyor belt 3 is driven via a belt pulley 11 on the second axle 7 by drive 8, is 90°. The angle of wrap β of the third conveyor belt 3 on a further belt pulley 12 is only slightly greater, and the angle of wrap β of the first conveyor belt 2 at a front belt pulley 13 is significantly smaller than 180°.

Figure 2:
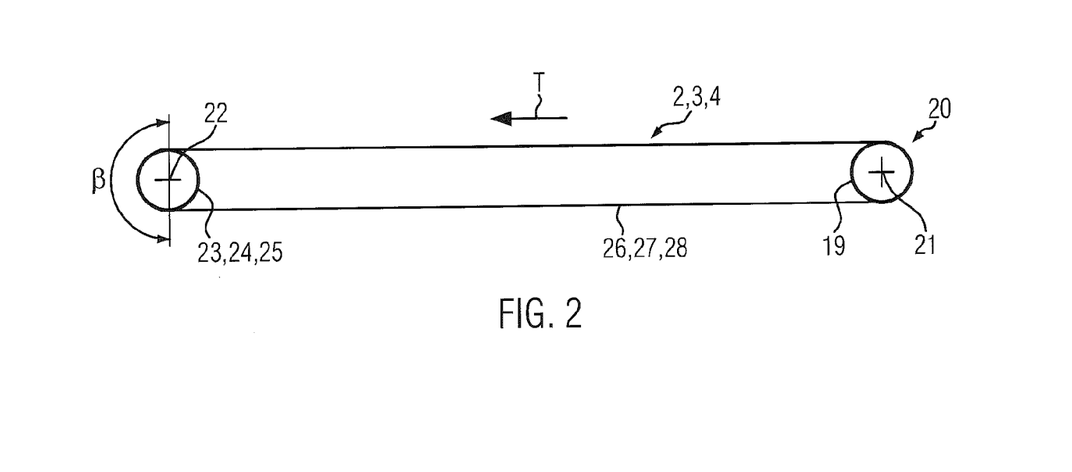
FIG. 2 is a schematic side view of one embodiment of a race track conveyor as a triple belt conveyor in accordance with the teachings of the present invention.

In direct comparison to FIG. 1, FIG. 2 shows a race track conveyor 20 according to one embodiment of the invention being provided with only two axles 21, 22. Only deflection wheels 19 for belts 26, 27, 28 of conveyor belts 2, 3, 4 are provided on the axle 21 disposed at the beginning of the race track conveyor 20 located at the right as shown. The belt pulleys 23, 24, 25 for driving belts 26, 27, 28 of the three conveyor belts 2, 3, 4 are all arranged in the direction of transport T at the downstream end of the race track conveyor 29. The embodiment of the respective drives is shown in more detail in FIG. 5. In contrast to the prior art shown in FIG. 1, it can be clearly seen in FIG. 2 that by arranging only two axles 21, 22, the angles of wrap (β) are uniformly 180° thereby enabling smaller diameters of wheels and pulleys while having the same power transmission. The space required to house the conveyor is also reduced.

Figure 3A:
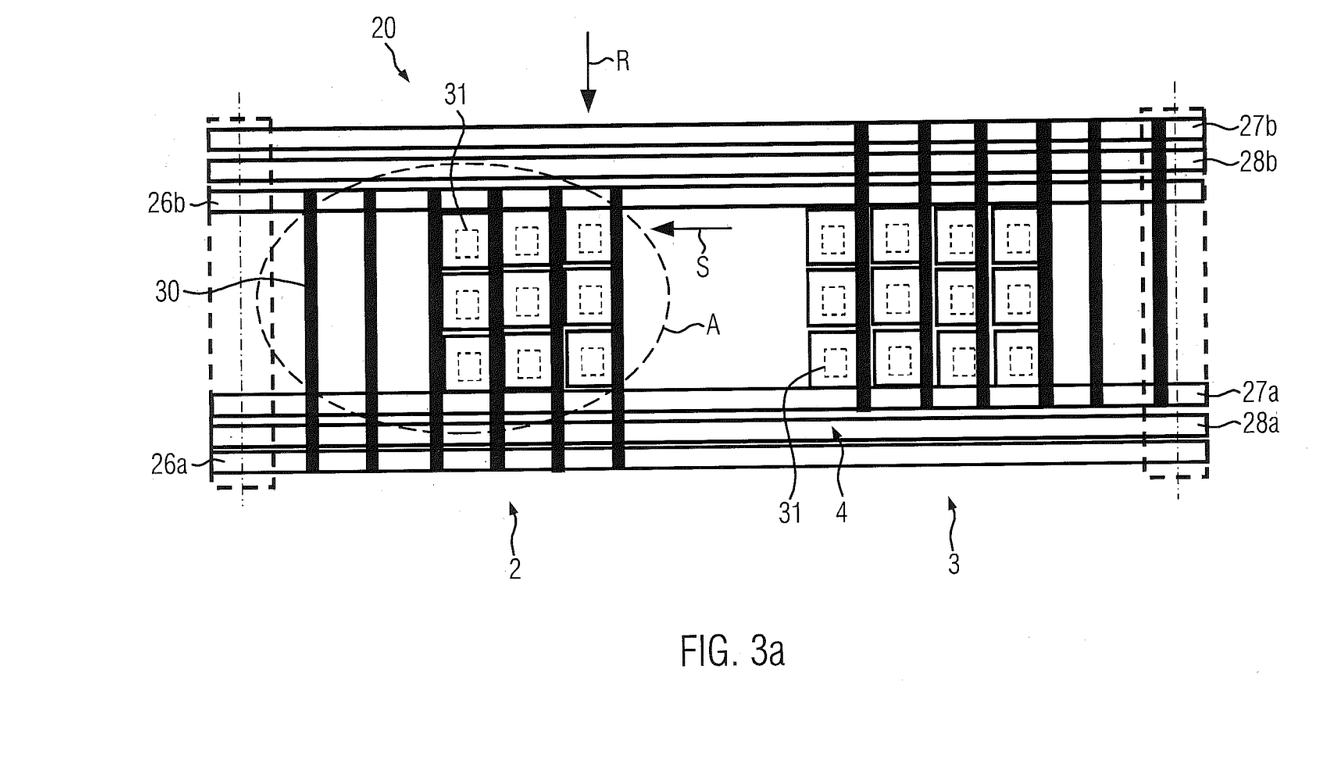
FIG. 3a is a schematic top plan view of one embodiment of a race track conveyor as a triple belt conveyor in accordance with the teachings of the present invention.

The mode of operation of the race track conveyor 20 shall be explained with reference to FIGS. 3a and 3b. FIG. 3a schematically in plan view shows the first conveyor belt 2 and the second conveyor belt 3, where conveyor belts 2, 3 each comprise two belts 26a, 26b, 27a, 27b, which are respectively jointly driven. Accordingly, the third conveyor belt 4 also comprises two belts 28a, 28b. It is shown in the example of the first conveyor belt 2 that the belts 26a, 26b on their outer side comprise a group of entraining members 29 (see FIG. 3b) being spaced at a regular distance from each other. Products 31, such as packages, can be transported using advance bars 30 which are aligned perpendicular to the direction of transport T and are attached onto entraining members 29 (see FIG. 3b) of both belts 26a, 26b. The advance bars 30 push a group of products 31 in the direction of transport T after they have been loaded at the front end of the race track conveyor 20. The group of products 31 of each one conveyor belt 2, 3, 4 is defined as the load capacity.

Figure 3B:
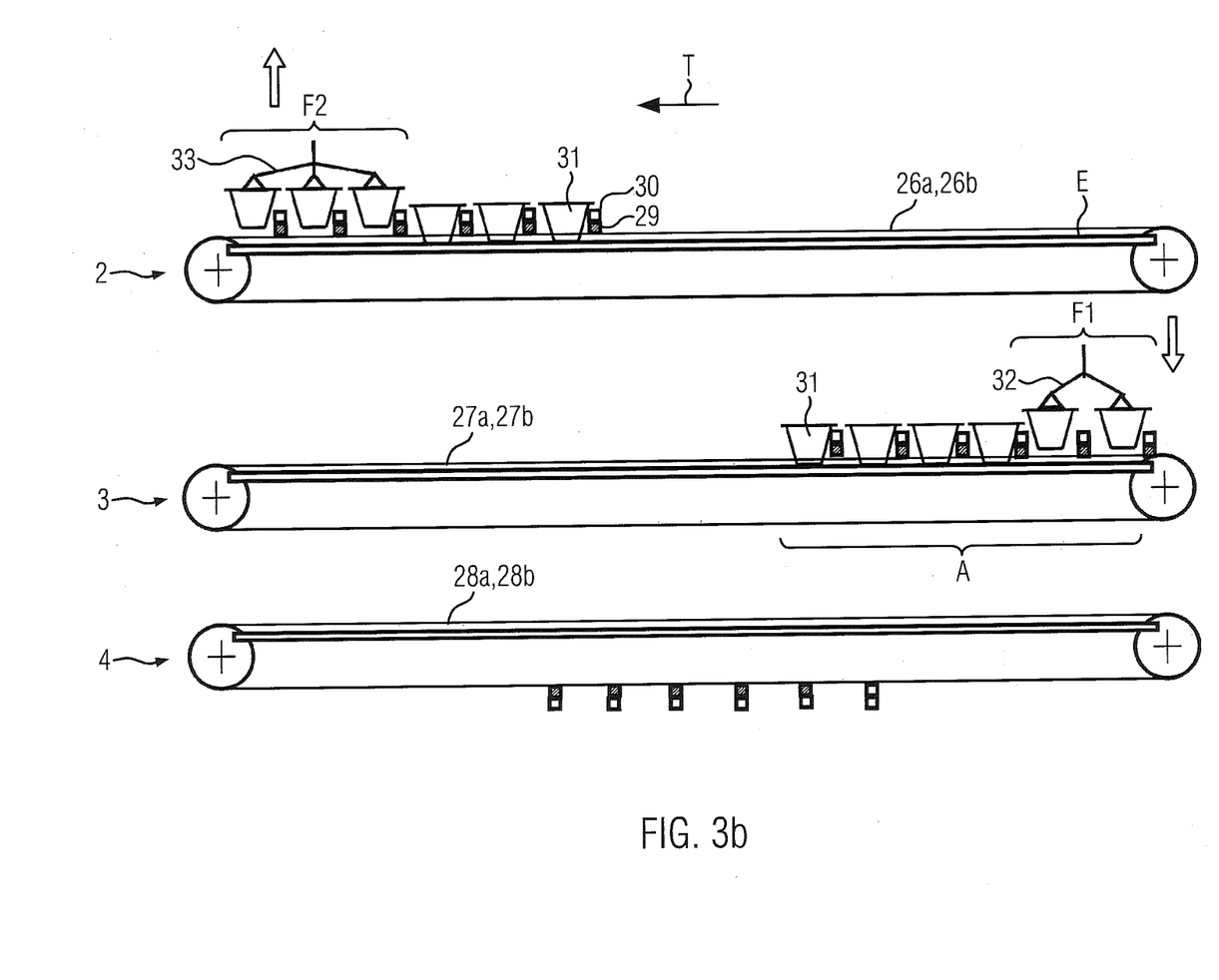

FIG. 3b shows the second conveyor belt 3 in a loading position for receiving the products 31 in a first format F1 from a robot 32. The first conveyor belt 2 is meanwhile in a discharge position for removing the product 31 from the race track conveyor 20 in which a further robot 33 collects the products 31 in a second format F2. The third conveyor belt 4 is performing a movement in the direction towards the loading position. During the advance movement, the products 31 may rest with their underside on a transport plane E.

Figure 4:
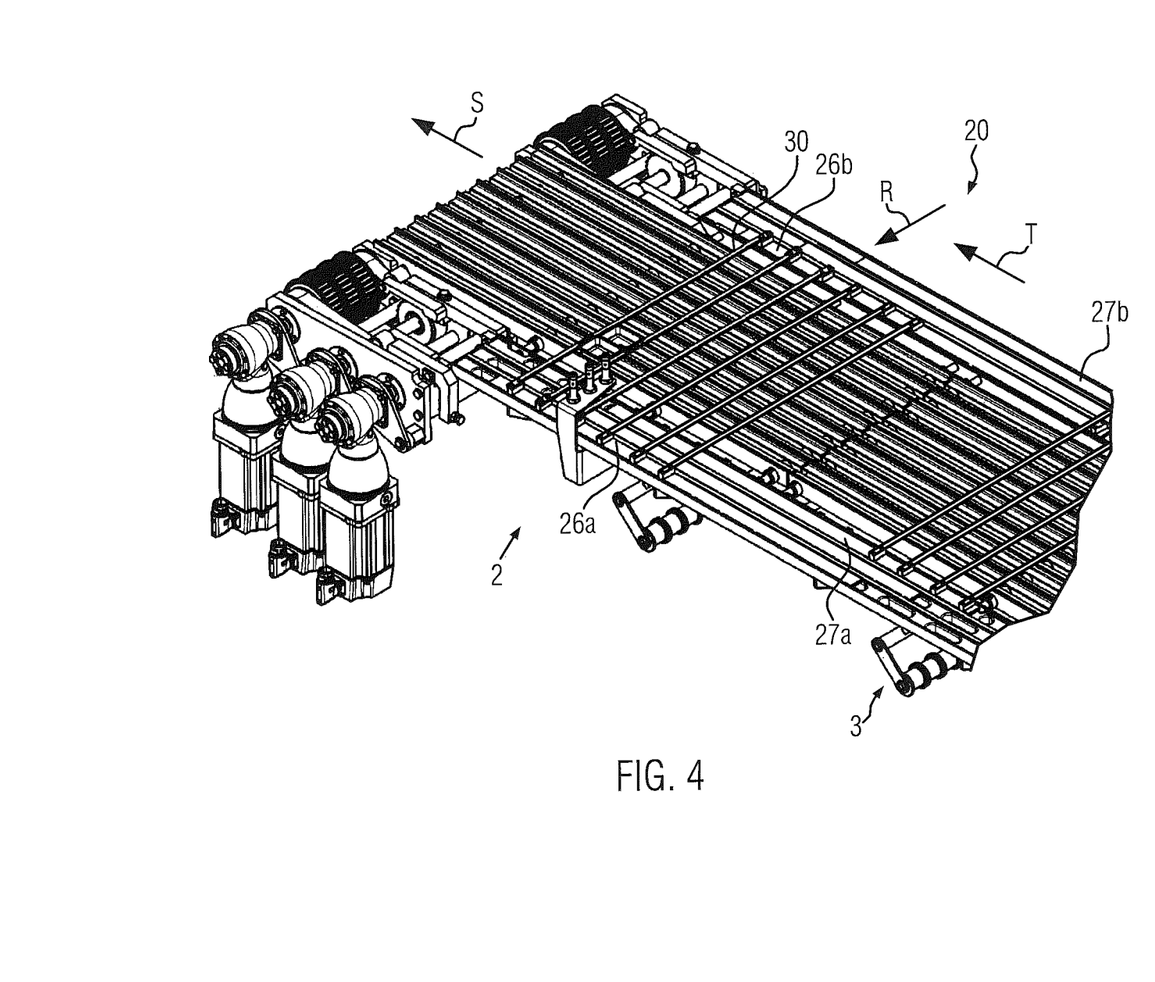
FIG. 4 is a top perspective view of one embodiment of a race track conveyor in accordance with the teachings of the present invention.

FIG. 4 shows a schematic partial view of an eight-track race track conveyor 20 with two belts 26a, 26b for a first conveyor belt 2 and two belts 27a, 27b for a second conveyor belt 3. Both belts 26a, 26b, 27a, 27b of the respective conveyor belt 2, 3 are each connected to six advance bars 30 which together transport a load capacity "A" of 48 or 8×6 products 31, respectively, as a common format. Tracks S of a format in the direction of transport T and rows R of a format are aligned orthogonally thereto. A "format" is formed from a group of products 31 in "n" tracks and "m" rows, where "n" and "m" are integers. Any number of tracks S and rows R is presently conceivable and thereby a variety of formats or loading capacities A, respectively. For better illustration of the conveyor belts 2, 3, the belts 26a, 26b, 27a, 27b are shown only in the region of the advance bars 30. Guides are also conceivable which are aligned in the direction of transport for guiding the products 31 in the respective track S. In this, adjacent tracks S can approach each other to reduce lateral spacing between adjacent products 31 (see FIGS. 3a and 3b). For example, an overlap of respectively designed packages 31 can be created which are loaded in this position into a carton by another robot 33 (see FIG. 3b).

Figure 5:
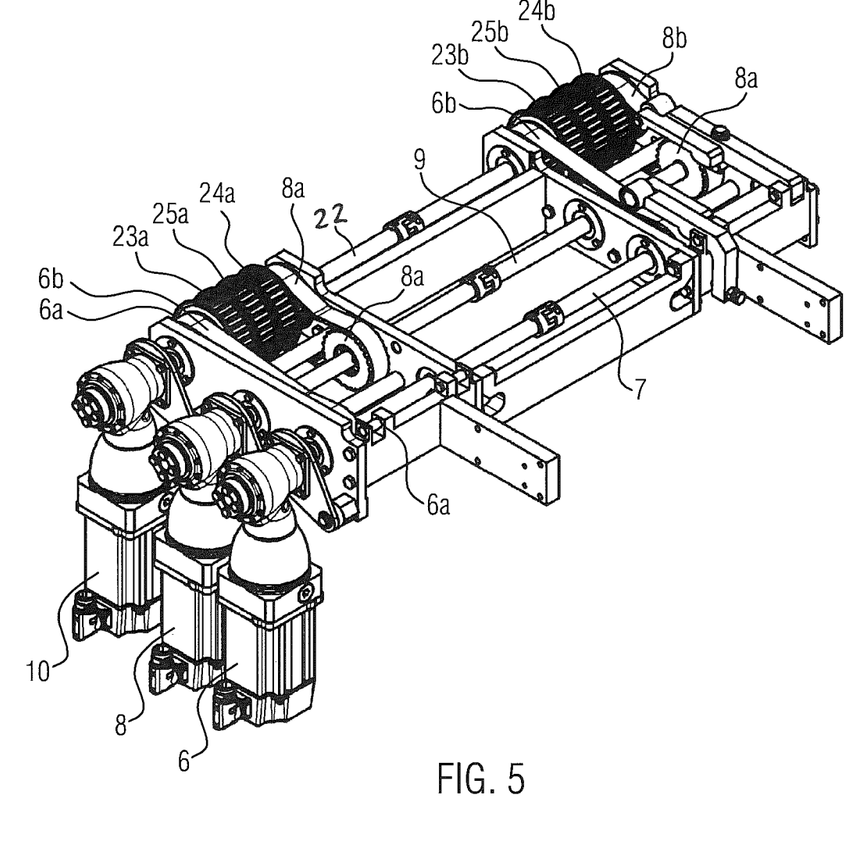
FIG. 5 is a top perspective view of one embodiment of a drive unit of the race track conveyor of FIG. 4.

FIG. 5 shows the arrangement of three drives 6, 8, 10 for the three conveyor belts 2, 3, 4, respectively. All driven belt pulleys 23a, 23b, 24a, 24b, 25a, 25b are arranged on the second axle 22. The two belt pulleys 25a, 25b for the third conveyor belt 4 are fixed onto the second axle 22 in a rotationally fixed manner and axle 22 is driven by the third drive 10. The further belt pulleys 23a, 23b, 24a, 24b are rotatably mounted on the second axle 22. The first drive 6 comprises a gear device, preferably a toothed belt gear, and drives a third axle 7 onto which two belt pulleys 6a are fixed that drive two further gear belt pulleys 6a via an intermediate belt 6b. In this, these gear belt pulleys 6a are with the belt pulleys 23a, 23b for the first conveyor belt 2 fixedly connected to each other.

Similarly thereto, the second drive 8 drives a fourth axle 9 onto which two gear belt pulleys 8a are fixed that drive two further gear belt pulleys 8a via an intermediate belt 8b, preferably a toothed belt. In this, these gear belt pulleys 8a are with the belt pulleys 25a, 25b for the second conveyor belt 3 fixedly connected to each other. A gear device therefore comprises two gear belt pulleys 6a or 8a, respectively, and a toothed belt, and in this embodiment is a toothed belt gear.

This design ensures that all three conveyor belts 2, 3, 4 are driven in a pulling manner at the end of the race track conveyor 20 thereby enabling a design with belt pulleys having small diameters and an angle of wrap β of 180° Similarly, two, four or more conveyor belts can in this manner be realized and are comprised by the invention. As shown in FIG. 2, the belts 26a, 26b, 27a, 27b, 28a, 28b are deflected by individual deflection rollers 19 at an axle 21 which is arranged at the beginning of the race track conveyor 20. Belt tensioning can be performed by the deflection rollers 19 or by other known tension rollers provided. All belts are in this embodiment rotatable about the same axis of rotation 22.

Figure 6:
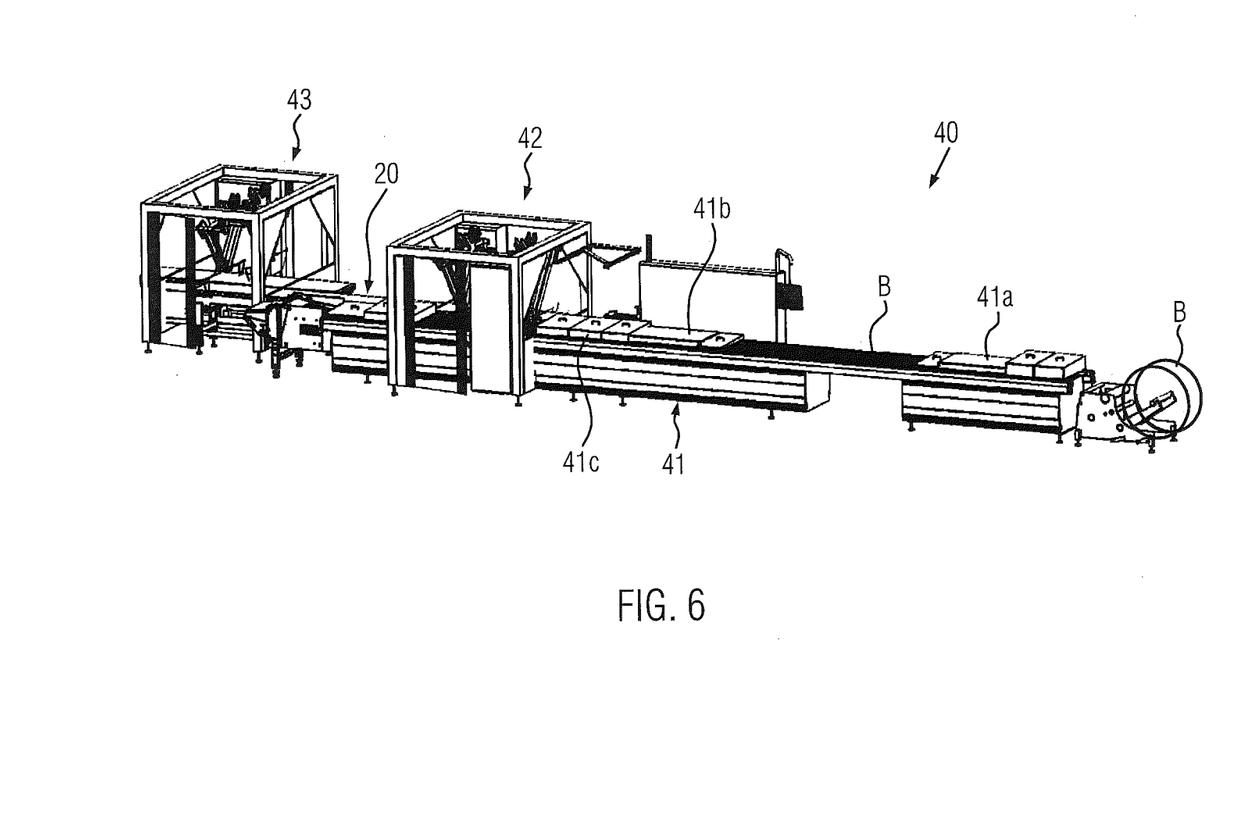
FIG. 6 is a schematic view of a packaging facility including one embodiment of a race track conveyor in accordance with the teachings of the present invention.

FIG. 6 shows a packaging facility 40 according to the invention comprising a thermo-forming packaging machine 41, a first transfer device 42, the race track conveyor 20 and a second transfer device 43. The mode of operation of the packaging facility 40 shall below be illustrated in more detail.

The intermittently operating thermoforming packaging machine 40 in a forming station 41 forms trays 41a into a film web B. Products are loaded into these trays and in a sealing station 41b sealed with a further film web and in a cutting station 41c separated such that a first format F1 or a group of packages 31, respectively, is provided in every work cycle at the end of the thermoforming packaging machine 40 for the first transfer device. A format is composed, for example, of eight rows R and eight tracks S and thereby of sixty-four packages 31 (see FIG. 3b) which are transferred by one or more robots 32 (see FIG. 3b) of the first transfer device 42 onto a first conveyor belt 2 (see FIGS. 3a and 3b). Each conveyor belt 2, 3, 4 of the race track conveyor 20 in this example has a loading capacity A of forty rows and eight tracks, and thereby of three hundred and twenty packages. Once the first conveyor belt 2 is completely filled with products 31 after several work cycles of the thermoforming packaging machine 41 and multiple transfers 31 of the packages from the thermoforming packaging machine 41 to the race track conveyor 20, conveyor belt 2 is moved by the first drive 6 to the end of the race track conveyor 20.

The packages 31 are there collected by the second transfer device 43 and loaded, for example, into a carton. As shown in FIGS. 3a and 3b, since the second format F2 of a carton can comprise five rows R and eight tracks S, the second transfer device 43 operates in a work cycle differing from the first transfer device 42. While the second transfer device 43 removes packages 31 of the first conveyor belt 2, the first transfer device 42 can remove packages 31 newly produced by the thermoforming packaging machine 41 and load them onto the second conveyor belt 3. The third conveyor belt 4 without packages is meanwhile on its way back from the second transfer device 43 to the first transfer device 42. Such an arrangement allows continuous operation of the packaging facility 40 despite differing formats F1, F2, which are on the one hand provided by the thermoforming packaging machine 41 and are on the other hand the format desired for the packages 31 to be finally packed into the carton. This can achieve maximum performance and use to capacity of the individual facility components, in particular of the robots of the transfer devices 42, 43.

Another embodiment is also conceivable in which a race track conveyor 20 may be disposed along a loading stretch of a thermoforming packaging machine 41 in order to load products with a transfer device from the race track conveyor 20 into the thermoforming packaging machine 41 or into the trays, respectively.

As is evident from the foregoing description, certain aspects of the present invention are not limited to the particular details of the examples illustrated herein. It is therefore contemplated that other modifications and applications using other similar or related features or techniques will occur to those skilled in the art. It is accordingly intended that all such modifications, variations, and other uses and applications which do not depart from the spirit and scope of the present invention are deemed to be covered by the present invention.

Other aspects, objects, and advantages of the present invention can be obtained from a study of the drawings, the disclosures, and the appended claims.

What is claimed is:

1. A conveyor comprising:
   at least two conveyor belts; and
   a first drive for a first conveyor belt of said at least two conveyor belts, the first drive comprising at least a first pulley driven by a first motor;
   a second drive for a second conveyor belt of said at least two conveyor belts, the second drive comprising at least a second pulley driven by a second motor;
   wherein said first pulley and said second pulley are disposed on a common axle, said first pulley fixed on said common axle and said second pulley disposed on said common axle to rotate independently of said common axle and said first pulley;
   said first motor drivingly engaged with said common axle for rotating said first pulley, and said second motor drivingly engaged with said second pulley by a gear device;
   wherein all drives are disposed at the downstream end of said conveyor in a direction of transport.

2. The conveyor according to claim 1, wherein each of said at least two conveyor belts comprises two belts, said first drive comprising said first pulley and a third pulley, each of said first and said third pulley being drivingly engaged with one of said two belts of said first conveyor belt and fixed to said common axle; said second drive comprises said second pulley and a fourth pulley, each of said second pulley and said fourth pulley being drivingly engaged with one of said two belts of said second conveyor belt and disposed on said common axle to rotate independently of said common axle, said first pulley and said third pulley, wherein said second motor is drivingly engaged with said fourth pulley by a second gear device.

3. The conveyor according to claim 2, wherein an angle of wrap of each of said two belts of each of said at least two conveyor belts around a driven belt pulley for each conveyor belt is at least 160°.

4. The conveyor according to claim 2, wherein each of said two belts of said at least two conveyor belts are connected to a plurality of advance bars, each of said advance bars spanning between said two belts of said at least two conveyor belts and each of said advance bars being oriented substantially transverse to said direction of transport.

5. The conveyor according to claim 1, wherein said conveyor changes a first format of a plurality of products when receiving products onto said conveyor to a second format of the plurality of products when removing said products from said conveyor, said second format having at least one of a different number of tracks than said first format and a different number of rows than said first format.

6. The conveyor according to claim 5, wherein a load capacity of each of said at least two conveyor belts corresponds to a multiple of both said first format and said second format.

7. The conveyor according to claim 1, wherein said gear device is a toothed belt gear driving a toothed belt.

8. A packaging facility comprising a packaging machine and the conveyor of claim 1.

9. A packaging facility according to claim 8, wherein said conveyor is disposed downstream of said packaging machine in a packaging direction.

10. The packaging facility according to claim 8, wherein a first transfer device and a second transfer device are respectively disposed at a first end and a second end of said conveyor.

11. The conveyor of claim 2 wherein said first gear device is a first toothed belt gear driving a first toothed belt, and said second gear device is a second toothed belt gear driving a second toothed belt, wherein said first toothed belt gear and said second toothed belt gear are fixed on a second axle, said second motor rotating said second axle.

12. The conveyor of claim 7 wherein said gear device is a toothed belt gear fixed on a second axle, said second motor driving said second axle.

13. The conveyor according to claim 1 further comprising:
a third conveyor, belt;
a third drive for driving said third conveyor belt, said third drive comprising a third pulley driven by a third motor, said third motor drivingly engaged with said third pulley by a second gear device;
said third pulley disposed on said common axle to rotate independently of said common axle, said first pulley, and said second pulley.

14. The conveyor according to claim 13, wherein each of said first, second and third conveyor belt comprises two belts;
said first drive comprising said first pulley and a fourth pulley, each of said first and said fourth pulley being fixed to said common axle and drivingly engaged with one of said two belts of said first conveyor belt and;
said second drive comprising said second pulley and a fifth pulley, each of said second and fifth pulleys being drivingly engaged with one of said two belts of said second conveyor belt, said second motor drivingly engaged with said fifth pulley by a third gear device;
said third drive comprising said third pulley and a sixth pulley, each of said third pulley and said sixth pulley being drivingly engaged with one of said two belts of said third conveyor, said third motor drivingly engaged with said sixth pulley by a fourth gear device;
said second pulley, said fifth pulley, said third pulley and said sixth pulley being disposed on said common axle to rotate independently of said common axle, said first pulley, and said fourth pulley.

15. The conveyor according to claim 13 wherein said first gear device is a first toothed belt gear driving a toothed belt, said first toothed belt gear fixed to a second axle, said second motor rotating said second axle; and
wherein said second gear device is a second tooth belt gear driving a second toothed belt, said second toothed belt gear fixed to a third axle, said third motor rotating said third axle.

16. A conveyor comprising:
a first conveyor belt driven by a first drive, said first drive comprising a first pulley driven by a first motor;
a second conveyor belt driven by a second drive, said second drive comprising a second pulley driven by a second motor;
a third conveyor belt driven by a third drive, said third drive comprising a third pulley driven by a third motor;
wherein said first pulley, said second pulley and said third pulley are disposed on a common axle;
said first pulley being fixed on said common axle;
said second pulley disposed on said common axle to rotate independently of said common axle, said first pulley and said third pulley;
said third pulley disposed on said common axle to rotate independently of said common axle, said first pulley and said second pulley;
said first motor rotating said common axle, and said second motor drivingly engaged with said second pulley by a first gear device, and said third motor drivingly engaged with said third pulley by a second gear device;
wherein all drives are disposed at the downstream end of said conveyor in a direction of transport.

17. The conveyor of claim 16 wherein said first gear device is a first toothed belt gear driving a toothed belt, said first toothed belt gear fixed to a second axle, said second motor rotating said second axle; and
wherein said second gear device is a second tooth belt gear driving a second toothed belt, said second toothed belt gear fixed to a third axle, said third motor rotating said third axle.

* * * * *